United States Patent
Leidel et al.

(10) Patent No.: US 11,085,762 B2
(45) Date of Patent: Aug. 10, 2021

(54) LEVEL WITH REMOVABLE END CAP WITH WALL GRIP

(71) Applicant: Milwaukee Electric Tool Corporation, Brookfield, WI (US)

(72) Inventors: Matthew Leidel, Wind Lake, WI (US); Eric Mackey, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 271 days.

(21) Appl. No.: 16/409,306

(22) Filed: May 10, 2019

(65) Prior Publication Data
US 2019/0331487 A1 Oct. 31, 2019

Related U.S. Application Data

(63) Continuation of application No. PCT/US2019/029157, filed on Apr. 25, 2019.

(60) Provisional application No. 62/663,538, filed on Apr. 27, 2018.

(51) Int. Cl.
*G01C 9/26* (2006.01)

(52) U.S. Cl.
CPC ..................... *G01C 9/26* (2013.01)

(58) Field of Classification Search
CPC ........................................... G01C 9/26
USPC .................................. 33/379, 381
See application file for complete search history.

(56) References Cited

U.S. PATENT DOCUMENTS

| | | | |
|---|---|---|---|
| 232,982 A | 10/1880 | Langdon | |
| 675,464 A | 6/1901 | Carlson | |
| 730,790 A | 6/1903 | Newman | |
| 1,033,742 A | 7/1912 | Skates | |
| 1,145,195 A | 7/1915 | Heisler | |
| 2,171,971 A | 9/1939 | Cravaritis et al. | |
| 2,535,791 A | 12/1950 | Fluke | |
| 2,634,509 A | 4/1953 | Roberts | |
| 2,695,949 A | 11/1954 | Ashwill | |
| 2,789,363 A | 4/1957 | Miley | |
| 2,939,947 A | 10/1958 | Schultz | |
| 3,036,791 A | 2/1960 | Siggelkow | |

(Continued)

FOREIGN PATENT DOCUMENTS

| CN | 101487701 | 8/2011 |
|---|---|---|
| DE | 7233283 | 2/1973 |

(Continued)

OTHER PUBLICATIONS

International Search Report and Written Opinion for International Application No. PCT/US2019/029157, dated Sep. 5, 2019, 12 pages.

(Continued)

*Primary Examiner* — George B Bennett
(74) *Attorney, Agent, or Firm* — Reinhart Boerner Van Deuren s.c.

(57) ABSTRACT

A level with a clip and removable end cap is provided. The end cap includes an outer member and locking member received within a clip that is affixed inside an end of the level. The locking member is inserted into the outer member pushing a moveable portion of the outer member into an engagement, such as a shearing engagement, that holds the end cap assembly in place relative to the level body. The clip includes a projection that interfaces with an aperture in the level frame.

20 Claims, 7 Drawing Sheets

(56) References Cited

U.S. PATENT DOCUMENTS

| | | | |
|---|---|---|---|
| 3,046,672 | A | 7/1962 | Lace |
| 3,100,937 | A | 8/1963 | Burch |
| 3,110,115 | A | 11/1963 | Hubbard |
| 3,116,563 | A | 1/1964 | Gelb an |
| 3,180,036 | A | 4/1965 | Meeks |
| 3,187,437 | A | 6/1965 | Hampton |
| 3,213,545 | A | 10/1965 | Wright |
| 3,279,080 | A | 10/1966 | Stepshinski |
| 3,832,782 | A | 9/1974 | Johnson et al. |
| 3,881,259 | A | 5/1975 | Pigeon |
| 4,099,331 | A | 7/1978 | Peterson et al. |
| 4,126,944 | A | 11/1978 | Burkhart |
| 4,338,725 | A | 7/1982 | Martin et al. |
| 4,407,075 | A | 10/1983 | MacDermott et al. |
| 4,463,501 | A | 8/1984 | Wright et al. |
| 4,546,774 | A | 10/1985 | Haught |
| 4,589,213 | A | 5/1986 | Woodward |
| 4,593,475 | A | 6/1986 | Mayes |
| 4,793,069 | A | 12/1988 | McDowell |
| 4,888,880 | A | 12/1989 | Parker |
| 5,033,199 | A * | 7/1991 | Wilcox .................... G01C 9/28 33/379 |
| 5,077,911 | A | 1/1992 | von Wedemeyer |
| 5,080,317 | A | 1/1992 | Letizia |
| 5,119,936 | A | 6/1992 | Sevey |
| 5,165,650 | A | 11/1992 | Letizia |
| 5,188,234 | A | 2/1993 | Fukuda et al. |
| 5,199,177 | A | 4/1993 | Hutchins et al. |
| 5,388,338 | A | 2/1995 | Majors |
| 5,412,876 | A | 5/1995 | Scheyer |
| 5,479,717 | A | 1/1996 | von Wedemeyer |
| 5,495,673 | A | 3/1996 | Gardiner et al. |
| 5,505,001 | A | 4/1996 | Schaver |
| 5,535,523 | A | 7/1996 | Endris |
| 5,659,967 | A | 8/1997 | Dufour |
| 5,671,856 | A | 9/1997 | Lisch |
| 5,709,034 | A | 1/1998 | Kohner |
| 5,749,152 | A | 5/1998 | Goss et al. |
| 5,755,037 | A | 5/1998 | Stevens |
| 5,784,792 | A | 7/1998 | Smith |
| 5,813,130 | A | 9/1998 | MacDowell |
| 5,878,802 | A | 3/1999 | Richter et al. |
| 6,003,234 | A | 12/1999 | Seibert |
| 6,029,360 | A | 2/2000 | Koch |
| 6,070,336 | A | 6/2000 | Rodgers |
| 6,173,507 | B1 | 1/2001 | Scarborough |
| 6,213,672 | B1 | 4/2001 | Varga |
| 6,381,859 | B1 | 5/2002 | Wedemeyer |
| 6,568,095 | B2 | 5/2003 | Snyder |
| 6,675,490 | B1 | 1/2004 | Krehel et al. |
| 6,732,441 | B2 | 5/2004 | Charay et al. |
| 6,760,975 | B1 | 7/2004 | Schmidt |
| 6,782,628 | B2 | 8/2004 | Liao |
| 6,785,977 | B1 | 9/2004 | Crichton |
| 6,792,686 | B2 | 9/2004 | Krehel et al. |
| 6,792,868 | B2 | 9/2004 | Teilhol et al. |
| 6,818,824 | B1 | 11/2004 | Marcou et al. |
| 6,839,973 | B1 | 1/2005 | Woodward |
| 6,915,585 | B2 | 7/2005 | Von Wedemeyer |
| 6,935,035 | B2 | 8/2005 | Smith |
| 6,988,320 | B2 | 1/2006 | Kallabis et al. |
| 7,028,413 | B2 | 4/2006 | Filipescu |
| 7,073,270 | B2 | 7/2006 | Kim |
| 7,089,676 | B2 | 8/2006 | Godinez |
| 7,150,106 | B2 | 12/2006 | Kallabis et al. |
| 7,152,335 | B2 | 12/2006 | Nichols |
| 7,204,029 | B2 | 4/2007 | Trait et al. |
| 7,228,637 | B2 | 6/2007 | Kim |
| 7,278,218 | B2 | 10/2007 | Levine |
| 7,316,074 | B2 | 1/2008 | Thin et al. |
| 7,343,692 | B2 | 3/2008 | Gould |
| 7,360,316 | B2 | 4/2008 | Hoover et al. |
| 7,363,719 | B2 | 4/2008 | Levinson et al. |
| 7,392,594 | B2 | 7/2008 | Kesler |
| 7,398,600 | B2 | 7/2008 | Ming |
| 7,406,773 | B2 | 8/2008 | Helga |
| 7,409,772 | B1 | 8/2008 | Morrissey |
| 7,467,475 | B1 | 12/2008 | Cheek |
| 7,472,486 | B2 | 1/2009 | Trait et al. |
| 7,472,487 | B2 | 1/2009 | Trait et al. |
| 7,484,307 | B2 | 2/2009 | Abrecht |
| 7,513,055 | B2 | 4/2009 | Montgomery |
| 7,513,056 | B1 | 4/2009 | Hobden et al. |
| 7,520,065 | B2 | 4/2009 | Vernola |
| 7,536,798 | B2 | 5/2009 | Silberberg |
| 7,552,540 | B2 | 6/2009 | Ming |
| 7,565,749 | B2 | 7/2009 | Helcia |
| 7,568,292 | B2 | 8/2009 | Maruyama |
| 7,607,235 | B1 | 10/2009 | Morrissey |
| 7,644,506 | B2 | 1/2010 | Wong |
| 7,675,612 | B2 | 3/2010 | Kallibis |
| 7,685,723 | B2 | 3/2010 | Kallibis |
| 7,748,128 | B2 | 4/2010 | Martin |
| 7,735,229 | B2 | 6/2010 | Allemand |
| 7,765,706 | B2 | 8/2010 | Scheyer |
| 7,770,298 | B1 | 8/2010 | Wojciechowski et al. |
| 7,802,371 | B2 | 9/2010 | Ming |
| 7,827,699 | B2 | 11/2010 | Montgomery |
| 7,832,112 | B2 | 11/2010 | Christianson |
| 7,866,055 | B2 | 1/2011 | Zhang et al. |
| 7,946,045 | B2 | 5/2011 | Allemand |
| 8,011,108 | B2 | 9/2011 | Upthegrove |
| 8,061,051 | B2 | 11/2011 | Allemand |
| 8,109,005 | B2 | 2/2012 | Hudson et al. |
| 8,291,605 | B2 | 10/2012 | Christianson |
| 8,336,221 | B2 | 12/2012 | Steele et al. |
| 8,413,342 | B2 | 4/2013 | Christianson |
| 8,443,812 | B2 | 5/2013 | Regalado et al. |
| 8,631,584 | B2 | 1/2014 | Steele et al. |
| 8,826,554 | B2 | 9/2014 | Bariteau |
| 8,850,710 | B1 | 10/2014 | Rodrigue et al. |
| 8,910,390 | B2 | 12/2014 | Steele et al. |
| 8,925,212 | B2 | 1/2015 | Allemand |
| 9,021,710 | B2 | 5/2015 | Silberberg |
| 2001/0013176 | A1 * | 8/2001 | Ruther .................... G01C 9/26 33/451 |
| 2003/0005590 | A1 | 1/2003 | Snyder |
| 2003/0163927 | A1 | 9/2003 | Kallabis et al. |
| 2005/0155241 | A1 | 7/2005 | Scheyer |
| 2005/0160610 | A1 | 7/2005 | Scheyer |
| 2005/0223577 | A1 | 10/2005 | Scarborough |
| 2006/0053563 | A1 | 3/2006 | Skinner |
| 2006/0143933 | A1 | 7/2006 | Kallabis et al. |
| 2006/0196061 | A1 | 9/2006 | Nichols |
| 2006/0248738 | A1 * | 11/2006 | Tran .................... G01C 9/26 33/451 |
| 2006/0283031 | A1 | 12/2006 | Ming |
| 2007/0028472 | A1 | 2/2007 | Brown |
| 2007/0113413 | A1 | 5/2007 | Feliciano |
| 2007/0113414 | A1 | 5/2007 | Levinson et al. |
| 2007/0175056 | A1 | 8/2007 | Tran et al. |
| 2007/0234581 | A1 | 10/2007 | Ming |
| 2008/0022543 | A1 | 1/2008 | Kesler |
| 2008/0141546 | A1 | 6/2008 | Strutt et al. |
| 2008/0222907 | A1 | 9/2008 | Silberberg |
| 2008/0271331 | A1 | 11/2008 | Allemand |
| 2008/0282562 | A1 | 11/2008 | Allemand |
| 2008/0301957 | A1 | 12/2008 | Vernola |
| 2009/0013545 | A1 | 1/2009 | Cheek |
| 2009/0158605 | A1 | 6/2009 | Montgomery |
| 2010/0000105 | A1 | 1/2010 | Zhang |
| 2010/0000106 | A1 | 1/2010 | Zhang |
| 2010/0005671 | A1 | 1/2010 | Hudson et al. |
| 2010/0095543 | A1 | 4/2010 | Inthavong |
| 2010/0205814 | A1 | 8/2010 | Allemand |
| 2011/0099823 | A1 | 5/2011 | Christianson et al. |
| 2011/0099824 | A1 | 5/2011 | Christianson et al. |
| 2011/0119941 | A1 | 5/2011 | Steele et al. |
| 2011/0265338 | A1 | 11/2011 | Christianson et al. |
| 2013/0091717 | A1 | 4/2013 | Steele |
| 2013/0167387 | A1 | 7/2013 | Lueck et al. |
| 2013/0305548 | A1 | 11/2013 | Lueck et al. |
| 2014/0007438 | A1 | 1/2014 | Silberberg |
| 2014/0007439 | A1 | 1/2014 | Silberberg |

(56) References Cited

U.S. PATENT DOCUMENTS

| | | |
|---|---|---|
| 2014/0373371 A1 | 12/2014 | Silberberg |
| 2016/0138916 A1 | 5/2016 | Neitzell |
| 2016/0138917 A1 | 5/2016 | Schwoegler |
| 2016/0138918 A1 | 5/2016 | Neitzell |
| 2018/0094925 A1* | 4/2018 | Mackey .................. G01C 9/34 |
| 2019/0056225 A1* | 2/2019 | Guma ..................... G01C 9/26 |

FOREIGN PATENT DOCUMENTS

| | | |
|---|---|---|
| EP | 126844 | 12/1984 |
| EP | 919786 | 6/1999 |
| EP | 1167921 | 1/2002 |
| EP | 1225671 | 7/2002 |
| EP | 1340960 | 9/2003 |
| EP | 2056065 | 5/2009 |
| GB | 1529608 | 10/1978 |
| GB | 2364950 | 2/2002 |
| GB | 2436432 | 9/2007 |
| JP | H11173843 | 7/1999 |
| JP | H11183170 | 7/1999 |
| JP | 2007532922 | 11/2007 |
| WO | WO 2008144545 | 11/2008 |

OTHER PUBLICATIONS

International Searching Authority, "International Search Report and Written Opinion," issued in connection with International Patent Application No. PCT/US2015/060652, dated Jan. 28, 2016, 13 pages.

International Searching Authority, "International Search Report and Written Opinion," issued in connection with International Patent Application No. PCT/US2017/067601, dated Mar. 26, 2018, 12 pages.

* cited by examiner

LEVEL WITH REMOVABLE END CAP WITH WALL GRIP

CROSS-REFERENCE TO RELATED PATENT APPLICATION

This application is a continuation of International Application No. PCT/US2019/029157, filed Apr. 25, 2019, which claims the benefit of and priority to U.S. Provisional Application No. 62/663,538, filed Apr. 27, 2018, all of which are incorporated herein by reference in their entireties.

BACKGROUND OF THE INVENTION

The present disclosure relates generally to the field of levels. The present disclosure relates specifically to a level with a removable end cap.

Levels are used for a variety of applications, particularly in the building and construction trades. Traditionally, to measure orientation a level uses one or more vials that contain a liquid (e.g., ethanol) and a small bubble of gas (e.g., air). The walls of the vial are arcuate-shaped such that when the level is placed on a sufficiently horizontal or vertical surface, the bubble of air is aligned at or near the center of at least one of the vials.

SUMMARY OF THE INVENTION

One embodiment of the disclosure relates to a level including a longitudinal axis, a frame, an orientation measuring component, such as a spirit vial or an accellerometer, and a clip. The frame includes an upper wall, a lower wall, a planar base surface defined by the lower wall, and two opposing sidewalls extending between the upper and lower walls. An interior passageway is defined by interior surfaces of the upper wall, the lower wall and sidewalls. The frame defines an aperture near one end of the frame. The clip includes a first wall with a first end proximate the end of the frame when the clip is coupled to the frame, a second wall, an aperture defined within the first wall, and a projection. The clip is received within the passageway and the projection engages the aperture of the frame. The projection extends outwardly from the first wall. The projection is positioned so that there exists at least one line parallel to the level's planar base surface that extends from the aperture through the projection to the first end of the first wall.

In specific embodiments, the first wall's aperture has a height (e.g., measured along an axis perpendicular to the planar base surface). The first wall's projection defines a second height (e.g., measured along the axis perpendicular to the planar base surface). The height of the projection is greater than the height of the aperture. The projection defines a depressed surface and an elevated surface that both face outwardly from the first wall, and the elevated surface protrudes further from the first wall than the depressed surface. The level further includes an outer member and a locking member. The outer member is received between the first and second walls of the clip, and includes a movable tab. The locking member is disposed within the outer member, and biases the moveable tab to engage the aperture of the first wall of the clip. The second wall defines an aperture, and the outer member comprises a second movable tab that engages the second wall's aperture. The clip's first and second walls are biased against the frame. The clip includes an end wall that extends between the first and second walls.

In another embodiment, a level includes a longitudinal axis, a frame, an orientation measuring component, and a clip. The frame defines a hollow cavity at an end of the frame, and includes an upper wall, a lower wall, a planar base surface defined by the lower wall, and first and second opposing sidewalls that both extend between the upper and lower walls. An aperture is defined within the first sidewall near a first end of the frame. The clip includes a first wall, a second wall, an aperture defined within the first wall, and a projection. The projection extends outwardly from the first wall, engages the first sidewall's aperture, and defines an elevated surface that extends at least to an outermost lateral surface of the frame's first sidewall.

In another embodiment, the level includes a frame, an orientation measuring component, and a clip. The frame includes an upper wall, a lower wall, a longitudinal axis, a planar base surface defined by the lower wall, and first and second opposing sidewalls that both extend between the upper and lower walls. The first sidewall defines an elongate aperture. The orientation measuring component is supported by the frame. The clip includes a first wall, a second wall, an aperture defined within the first wall, and an elongate projection. The projection extends outwardly from the first wall and engages the first sidewall's elongate aperture.

One embodiment of the disclosure relates to a level with a removable end cap. The end cap includes a clip, an outer member and a locking member. The clip includes a projection, such as a wall grip, that is received through an opening in the level frame walls.

Some embodiments of the disclosure relate to a level with removable end caps that are placed in a longitudinal end of a level frame. The clip is coupled to the level frame by wall grips that are received through apertures proximate an end of the level frame. The clip includes an end wall and two sidewalls extending from the end wall. Together, the end wall and sidewalls partially define an interior of the clip that other components of the end cap are placed within. The wall grips extend from an exterior surface of the sidewall and are configured to reduce slippage between the level and work pieces (e.g., a wall). The wall grip is sized such that its outermost lateral surface extends beyond the outermost lateral surface of the level frame or body such that the wall grip defines an outermost surface which will contact a workpiece or wall when the level is placed adjacent the workpiece or wall.

The outer member component is placed in the interior of the clip. The outer member couples to the clip by movable walls that have protrusions extending from an exterior surface of the movable walls. The protrusions are received through apertures in the sidewalls of the clip. The outer member includes an internal cavity that the movable walls partially define. When a locking member is disposed within the internal cavity of the outer member, the locking member prevents the protrusions of the movable walls from disengaging with the aperture of the clips.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

DETAILED DESCRIPTION

Referring generally to the figures, various embodiments of a level are shown. Various embodiments of the level discussed herein include an innovative removable end cap that is easy to manufacture and resilient to shock and that includes a wall grip structure to limit/prevent sliding of the level when placed adjacent to a workpiece or wall.

For some levels, the level frame or body is formed a metal material that has been formed into a generally hollow form with a mostly vacant interior. A cap is placed at either end of the level to cover the openings at the ends of the level frame. The caps described in this disclosure provide an effective structure to securely enclose the ends of the level.

In one embodiment, the wall cap includes a clip, an outer member and a locking member that are placed within an interior of the clip. The clip includes sidewalls with one or more wall grips that are received through an opening in the sidewall of the level to protrude to a position where the grip can engage with a work surface or wall. The clip sidewalls are biased away from each other when the clip is placed within the level. As a result, after wall grips are received through level frame apertures, the clip sidewalls resist attempts to remove the wall grips from the level frame apertures.

Once the clip is secured to the end of the level, the outer member is placed within the interior of the clip. The outer member includes a movable wall with a protrusion that is received through an aperture in the clip sidewall. After the outer member is secured to the clip, the locking member is placed within an interior of the outer member. When the locking member is inserted in the interior of the outer member, the locking member pushes the movable walls and secures the protrusion on the movable walls to the aperture of the clip. The locking member includes a pull portion that provides gripping purchase to remove the locking member.

Figure 1:
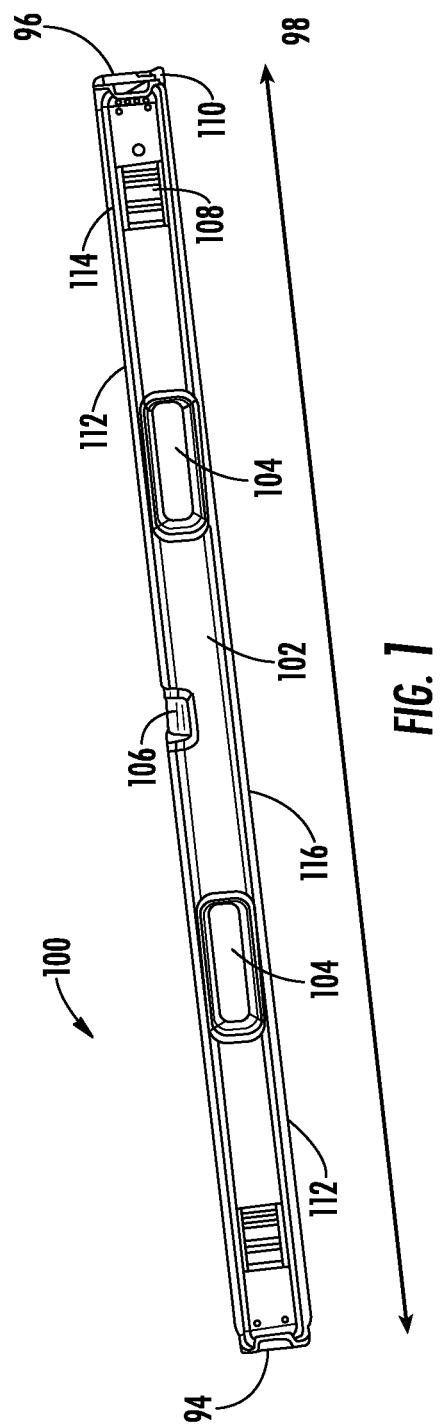
FIG. 1 is a perspective view of a level according to an embodiment.
Figure 2:
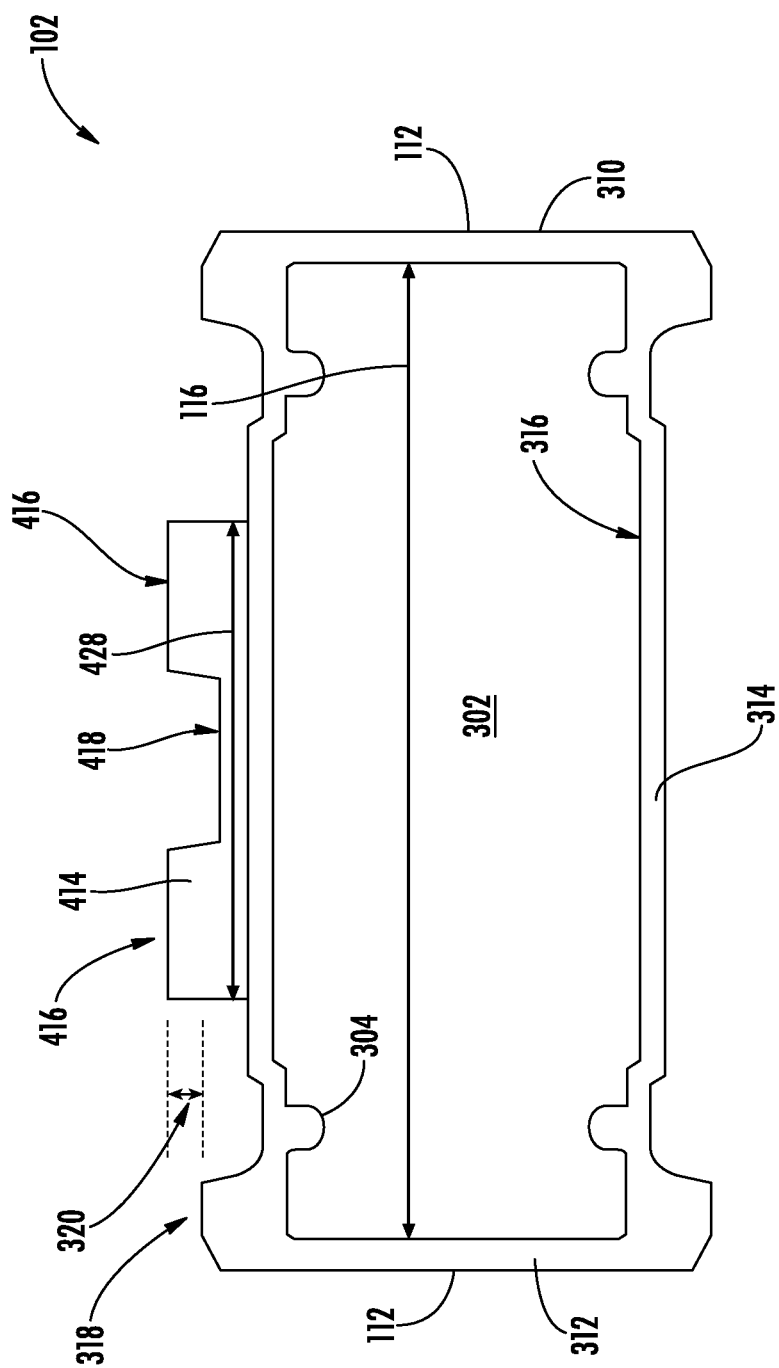
FIG. 2 is a cross-sectional view of the body of level of FIG. 1, according to an exemplary embodiment.
Figure 3:
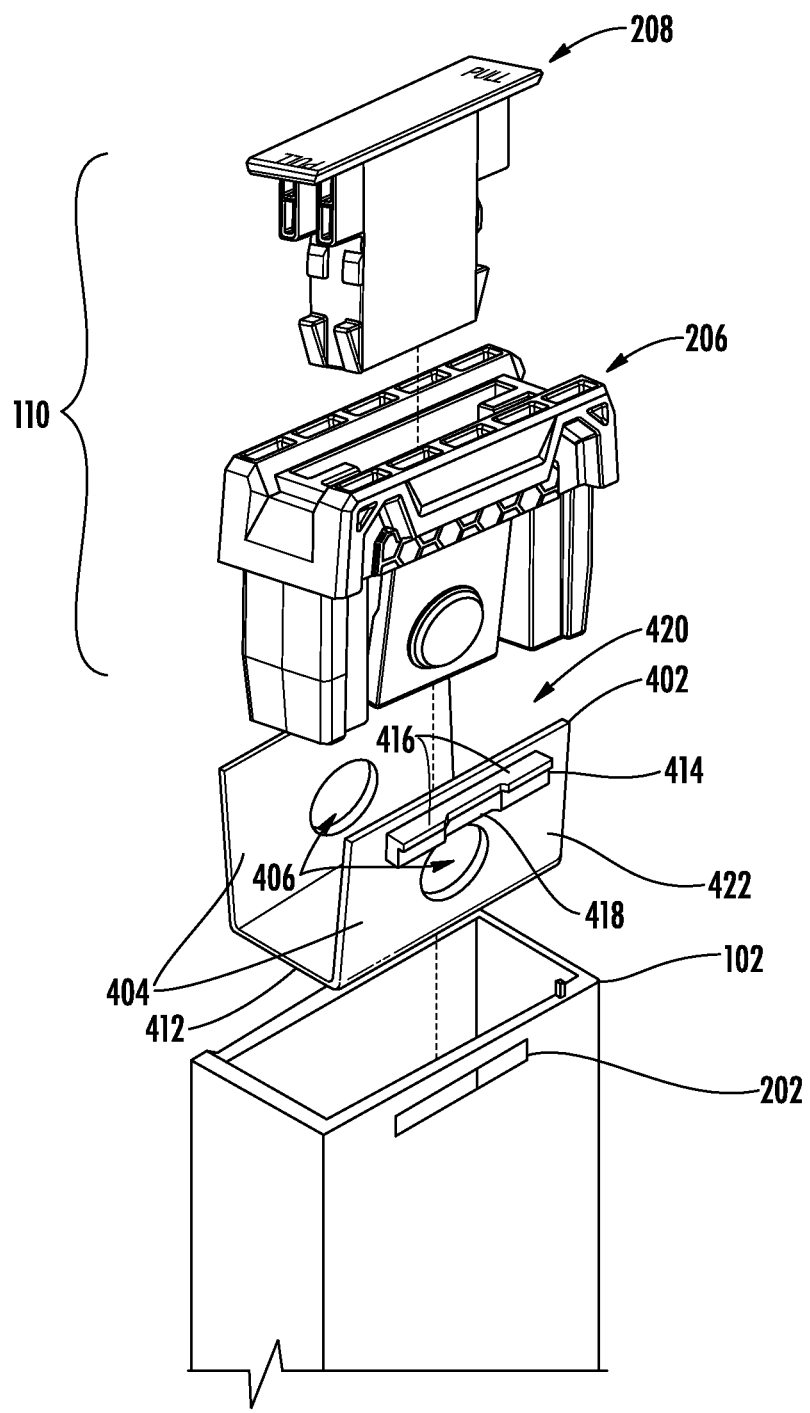
FIG. 3 is an exploded perspective view of a level end cap, according to an embodiment.
Figure 4:
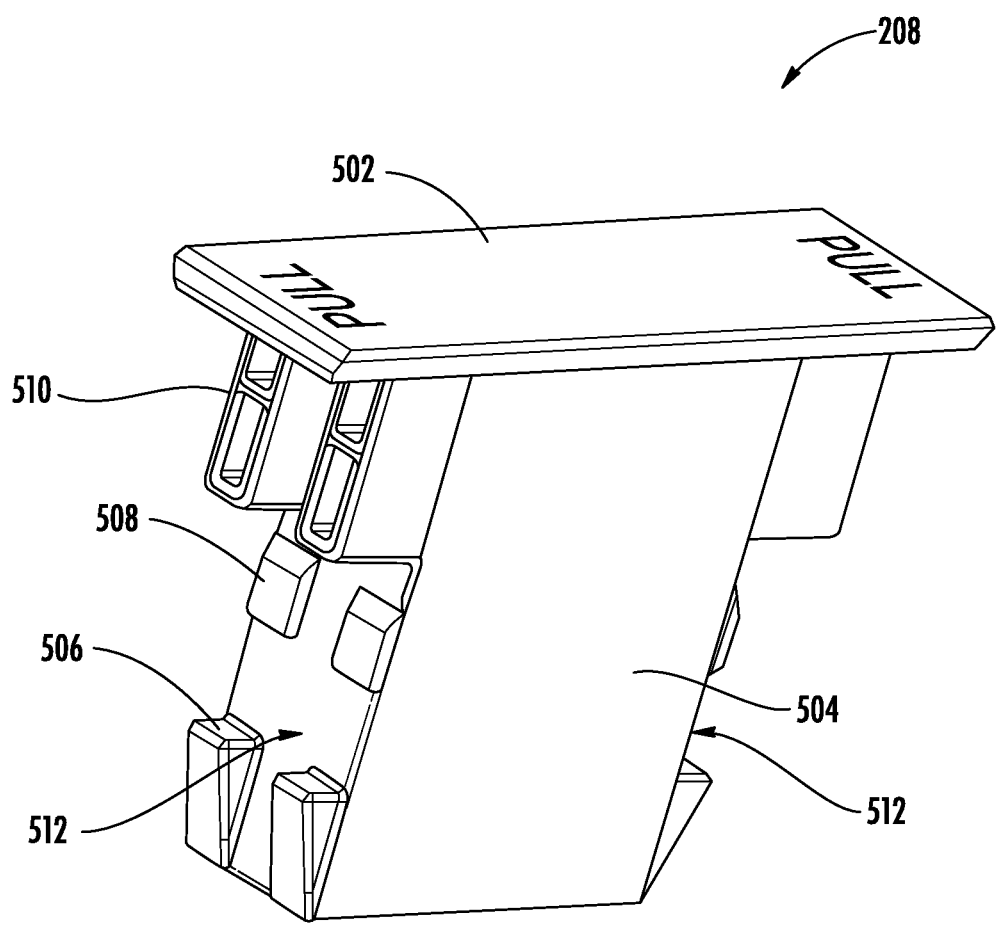
FIG. 4 is a perspective view of an end cap locking member, according to an exemplary embodiment.

Referring to FIGS. 1-2, a level, such as spirit level 100, is shown according to an exemplary embodiment. In general, level 100 includes frame 102, first and second handles 104, a first orientation measuring component, such as horizontal spirit vial 106, a second orientation measuring component, such as vertical or plumb spirit vial 108, and removable end caps 110.

Level 100 includes measuring surfaces 112 on a top and bottom of level 100 (from the perspective of FIG. 1) that extend from first end 94 to second end 96 along a primary axis 98, shown here as upper planar surface 112 and lower planar surface 112. Measuring surfaces 112 of level 100 provide very flat surfaces (e.g., planar surfaces) that permit level 100 to measure the orientation of other objects by placing one of the measuring surfaces of level 100 against the object being measured. It is considered that level 100 may have any number of orientation-measuring surfaces (e.g., 1-4). Level 100 includes an end cap assembly, shown as an end cap 110, at each end of the level 100. End cap 110 is arranged to protect the end of the level 100 and is removable.

In the illustrated embodiment, the level 100 is a box-type level where the frame 102 is substantially box-shaped as illustrated in FIG. 2. Level frame 102 includes upper wall 310, lower wall 312 and opposing sidewalls 314. Top and bottom measuring surfaces 112 are located peripherally outside upper wall 310 and lower wall 312, respectively. The inner surfaces 316 of these walls define frame interior 302, shown as a passageway. Frame 102 includes rib protrusions 304 that extend along the interior surface 316 and are disposed adjacent to corners of frame 102.

Referring to FIGS. 3-7, clip 402 secures end cap 110 to one of first end 94 or second end 96 of level 100. Sidewalls 404 of clip 402 are biased away from each other so that sidewalls 404 need to be pushed towards each other to insert clip 402 into frame 102 of level 100. When clip 402 is inserted into frame 102, end wall 412 of clip 402 is inserted first, followed by sidewalls 404. Clip 402 couples to frame 102 via wall grip 414, which is received through aperture 202 of level frame 102.

Wall grip 414 projects from outer surface of sidewall 404 in a direction away from the other sidewall 404 of clip 402. In various embodiments wall grip 414 is coupled to sidewall via co-molding or overmolding. Wall grip 414 includes a surface facing away from clip sidewall 404 that includes two elevated gripping surfaces 416 and a depression 418 between elevated gripping surfaces 416 (best shown in FIG. 3). A width of depression 418 is approximately the same as a diameter of aperture 406 in clip sidewall 404. Shapes of wall grip 414 other than rectangular could be employed if desired. Aperture 406 in clip 402 is located between wall grip 414 and clip end wall 412. In one or more embodiments wall grip 414 is a single piece manufactured from a slippage-mitigating material, such as rubber and/or an elastomer, such as TPE, silicone, TPV, etc. In various embodiments wall grip 414 is coupled to sidewall via co-molding or overmolding.

Referring to FIG. 2, elevated gripping surfaces 416 extend horizontal distance 320 beyond an outermost lateral surface 318 of frame 102. This distance 320 allows for wall grip 414 to engage with a surface of the work piece being measured. In an alternative embodiment, distance 320 is 0 (zero) or near zero and wall grip and outermost lateral surfaces 318 cooperatively engage with a surface of the work piece being measured. In the embodiment shown in FIG. 2, depressed surface 418 of wall grip 414 does not extend beyond outermost lateral surfaces 318 (best shown in FIG. 2), however it is also considered that depressed surface 418 of wall grip 414 does extend beyond outermost lateral surfaces 318.

Clip 402 is mounted in level frame 102 with clip sidewalls 404 running along and generally parallel to the inner surface 316 of sidewall 314. Clip sidewalls 404 are deformed towards each other, and this helps to retain the clip 402 within frame 102. In various embodiments adhesive is applied between clip sidewalls 404 and interior surface 316 to supplement the securing force between clip 402 and frame 102.

In one embodiment, movable walls 604 of outer member 206 are configured to deflect with respect to first end 610, which itself is coupled to a top structure 612 of outer member 206. When outer member 206 is inserted in clip 402, locking buttons 606, shown as movable tabs, on movable walls 604 press against clip sidewalls 404, thus deforming movable walls 604 towards each other. When locking buttons 606 align with clip apertures 406 in clip sidewalls 404, locking buttons 606 are received through clip apertures 406.

The flexibility of movable walls 604 permits locking buttons 606 to selectively engage and disengage with clip apertures 406. The insertion of locking member 208 into cavity 602 results in block portion 504 of locking member 208 pressing against movable walls 604. As a result of locking member 208 being placed within cavity 602 of outer member 206, movable walls 604 are restricted from bending sufficiently towards each other to disengage locking buttons 606 from clip apertures 406. In this manner, locking member 208 is moveable within outer member 206 between a locked position in which block portion 504 prevents locking button 606 from disengaging with clip sidewall 404 aperture 406, and an unlocked position in which the end cap 110 is ultimately removable from frame 102.

Locking member 208 includes a pull portion 502 and a block portion 504 that extends from the pull portion 502. The pull portion 502 is arranged to remain exterior to outer member 206 and provide a surface to move the locking member 208 to the unlocked position (i.e., so that locking member 208 is partially or completely removed from cavity 602 of outer member 206). One or more engagement bumps 508, tabs 506, and guide members 510 extend from lateral surfaces 512 of outer member 206. Tabs 506 engage with locking surface 704 of outer member 206 to secure locking member 208 in cavity 602 of outer member 206. Guide member 510 engages with guide slot 702 of outer member 206 to seat locking member 208 in the locked position when locking member 208 is fully positioned within cavity 602 of outer member 206.

Figure 5:
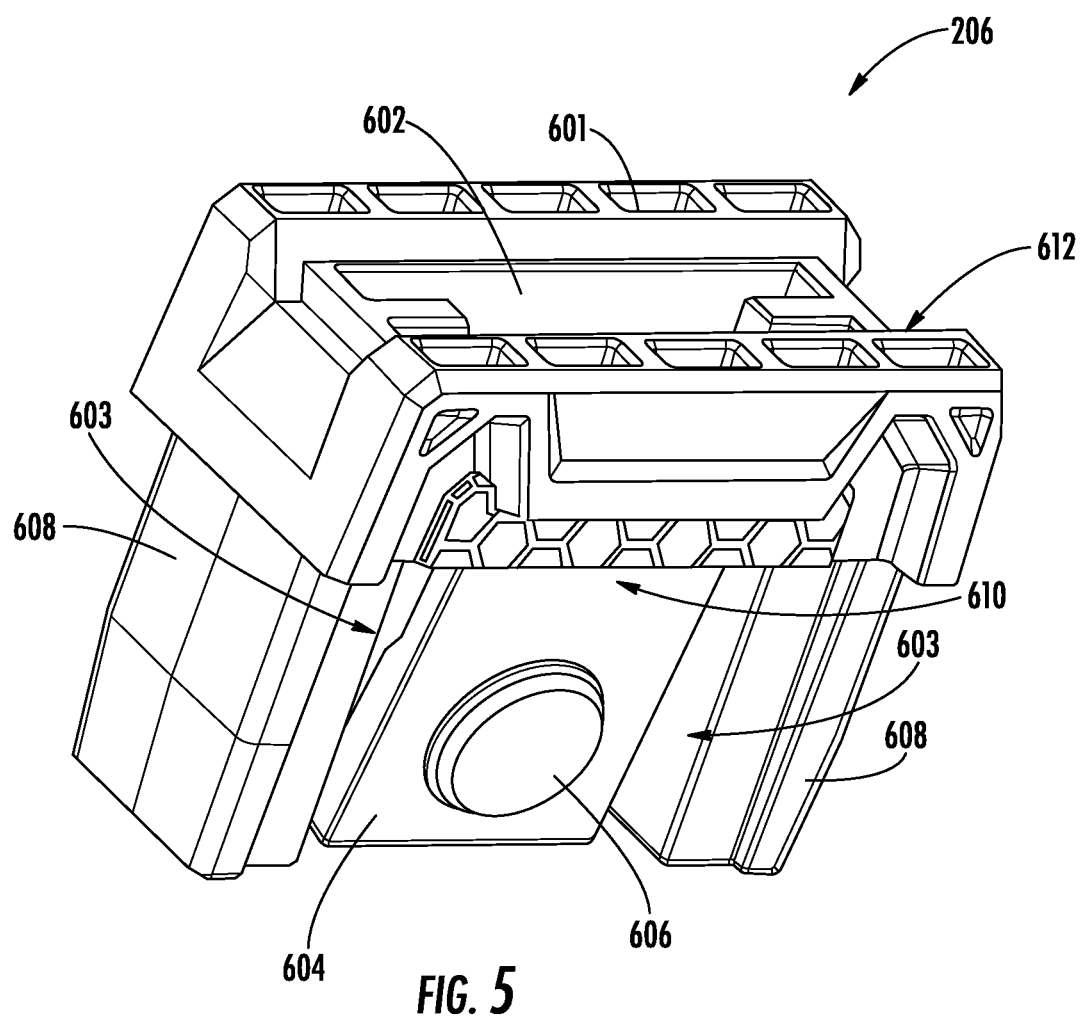
FIG. 5 is a perspective view of an end cap outer member, according to an exemplary embodiment.
Figure 6:
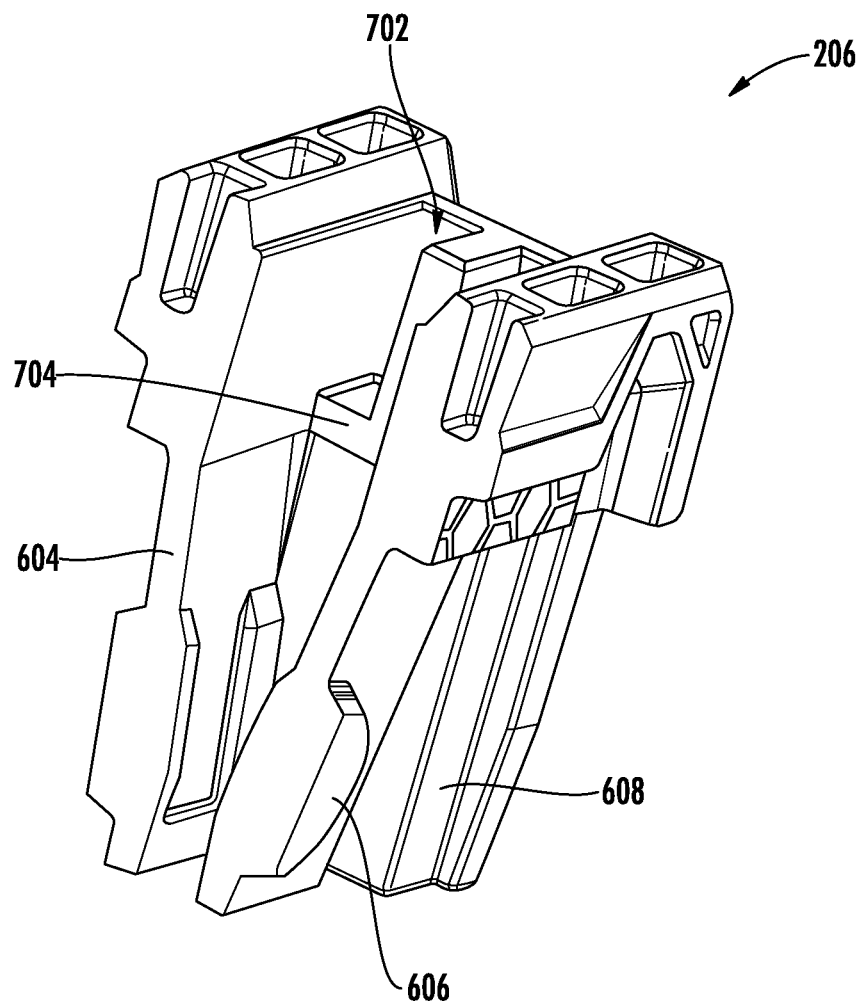
FIG. 6 is a perspective section view of the end cap outer member of FIG. 5, according to an exemplary embodiment.
Figure 7:
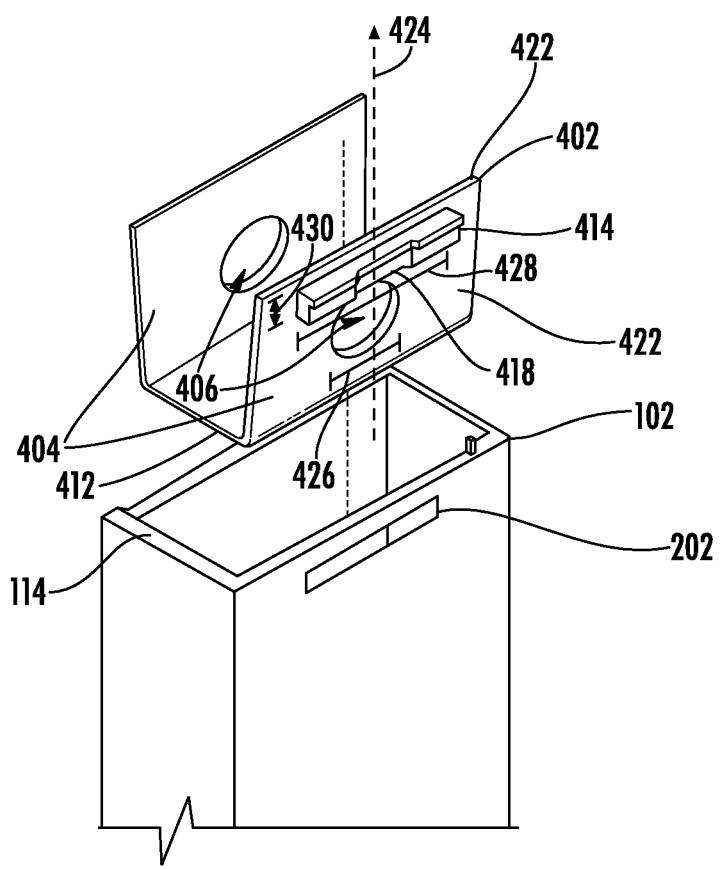
FIG. 7 is an exploded perspective view of a level end cap, according to an embodiment.

As shown in FIGS. 5-6, outer member 206 is an elongated member with cap portion 601 that remains outside of frame 102 when installed in clip 402, and side arms 608 extending away from cap portion 601 are arranged to engage the interior surfaces 316 of frame 102 when side arms 608 are positioned along the inner surfaces of upper wall 310 and lower wall 312 of level frame 102. A moveable portion, shown as first movable wall 604, includes a projection, shown as locking button 606, that is fixed with respect to movable wall 604 and is preferably formed as one piece with movable wall 604. A second movable wall 604 (best illustrated in FIG. 6) is positioned opposite first movable wall 604 and is substantially identical to first movable wall 604. In general, moveable walls 604 are separated from side arms 608 by gaps 603. This separation allows side arms 608 to be pushed outward by locking member 208 to create a coupling that secures end cap 110 to level frame 102.

Outer member 206 includes a guide slot 702 positioned and sized to receive guide member 510 of locking member 208. Outer member 206 also defines a cooperating surface, shown as locking surface 704, which operates to maintain the connection between locking member 208 and outer member 206 when end cap 110 is removed. In general, locking member 208 includes a stop structure that engages a cooperating surface of outer member 206 such that full removal of the locking member from the outer member is prevented when the locking member is in a locked position (i.e., outer member 206 and locking member 208 are held together when the end cap 110 is removed from frame 102).

In one or more embodiments clip 402 comprises end 422 that is near and proximate end 114 of frame 102, which is to say that end 422 of clip 402 and end 114 of frame 102 are less than 5 inches apart, or more specifically less than 3 inches apart, both distances measured along longitudinal axis 98 of frame 102. Wall grip 414 is disposed between aperture 406 within sidewall 404 such that there exists an intersecting line 424 parallel to longitudinal axis 98 that extends from aperture 406 through wall grip 414 to end 422 of clip 402. Sidewall's 404 aperture 406 defines height 426 that is measured along the axis perpendicular to planar base surface 112, and wall grip 414 defines height 428 that is also measured along the axis perpendicular to planar base surface 112. Frame 102 defines height 116 that is perpendicular to planar base surface 112 between base and upper surfaces 112. In one or more embodiments height 428 of wall grip 414 is at least 40% of height 116 of frame 102.

Wall grip 414 defines elevated surfaces 416 that protrude further from sidewall 404 than depressed surface 418. Wall grip 414 also defines length 430 that is measured along longitudinal axis 98.

In one embodiment only one sidewall 404 comprises aperture 406. In another embodiment both sidewalls 404 comprise apertures 406. In one embodiment only one sidewall 404 comprises wall grip 414. In another embodiment both sidewalls 404 comprise wall grips 414.

In one or more embodiments aperture 202 of frame 102 is elongate and wall grip 414 is also elongate such that wall grip 414 interfaces within aperture 202. Aperture 202 of frame 102 comprises a longitudinal axis that is perpendicular to planar base surface 112. Similarly, wall grip 414 comprises a longitudinal axis that is perpendicular to planar base surface 112. Broadly described, wall grip 414 defines a height at least 30% a height 116 of the frame, and more particularly wall grip 414 defines a height at least 45% a height 116 of the frame.

It should be understood that the figures illustrate the illustrative embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various illustrative embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or elements, and is not intended to be construed as meaning only one. As used herein, rigidly coupled refers to two components being coupled in a manner such that the components move together in fixed positional relationship when acted upon by a force.

Various embodiments of the disclosure relate to any combination of any of the features, and any such combination of features may be claimed in this or future applications. Any of the features, elements, or components of any of the illustrative embodiments discussed above may be utilized alone or in combination with any of the features, elements, or components of any of the other embodiments discussed above.

What is claimed is:

1. A level comprising:
    a longitudinal axis;
    a frame comprising:
        an upper wall;
        a lower wall;
        a planar base surface defined by the lower wall;
        two opposing sidewalls extending between the upper wall and the lower wall;
        an interior passageway defined by interior surfaces of the upper wall, the lower wall and sidewalls; and
        an aperture defined by the frame near an end of the frame;
    an orientation measuring component supported by the frame;
    a clip comprising:
        a first wall comprising a first end proximate the end of the frame when the clip is coupled to the frame;
        a second wall;
        an aperture defined within the first wall; and
        a projection extending from the first wall away from the second wall, wherein the projection is between the first wall's aperture and the first end of the first wall such that there exists at least one line parallel to the level's planar base surface that extends from the aperture through the projection to the first end of the first wall;
    wherein the clip is received within the passageway and the projection engages the aperture of the frame.

2. The level of claim 1, the first wall's aperture defines a first height measured along an axis perpendicular to the planar base surface, and the first wall's projection defines a second height measured along the axis perpendicular to the planar base surface, wherein the height of the projection is greater than the height of the aperture.

3. The level of claim 1, wherein the projection defines a depressed surface and an elevated surface that both face outwardly from the first wall, the elevated surface protrudes further from the first wall than the depressed surface.

4. The level of claim 1 further comprising:
    an outer member received between the first and second walls of the clip, the outer member comprising a movable tab; and
    a locking member disposed within the outer member, the locking member biases the moveable tab to engage the aperture of the first wall of the clip.

5. The level of claim 4, wherein the second wall defines an aperture, and the outer member comprises a second movable tab that engages the second wall's aperture.

6. The level of claim 1, wherein the clip's first and second walls are biased against the frame.

7. The level of claim 1, wherein the clip comprises an end wall that extends between the first and second walls.

8. A level comprising:
    a longitudinal axis;
    a frame defining a hollow cavity at an end of the frame, the frame comprising:
        an upper wall;
        a lower wall;
        a planar base surface defined by the lower wall;
        first and second opposing sidewalls that both extend between the upper wall and the lower wall; and
        an aperture defined within the first sidewall near a first end of the frame;
    an orientation measuring component supported by the frame;
    a clip comprising:
        a first wall;
        a second wall;
        an aperture defined within the first wall; and
        a projection extending outwardly from the first wall, the projection engages the first sidewall's aperture and defines an elevated surface that extends at least to an outermost lateral surface of the frame's first sidewall.

9. The level of claim 8, wherein the projection extends a distance beyond the outermost lateral surface of the first sidewall.

10. The level of claim 8, wherein the projection is coplanar with the outermost lateral surface of the first sidewall.

11. The level of claim 8, wherein the projection defines a plurality of elevated surfaces and a depressed surface, the plurality of elevated surfaces extend beyond the outermost lateral surface of the first sidewall and the depressed surface.

12. The level of claim 8, wherein the projection defines a plurality of elevated surfaces and a depressed surface, each extend beyond the outermost lateral surface of the first sidewall.

13. The level of claim 8, wherein a frame height is defined from the frame's planar base surface to an upper surface of the frame, the projection defines a projection height measured along an axis perpendicular to the planar base surface, the projection height is at least 40% of the frame height.

14. The level of claim 8, wherein the projection is made of a high friction material.

15. The level of claim 8, wherein the projection is made of at least one of rubber, an elastomer, a thermoplastic elastomer (TPE), silicone and a thermoplastic vulcanizates (TPV).

16. A level comprising:
a frame comprising:
   an upper wall;
   a lower wall;
   a longitudinal axis;
   a planar base surface defined by the lower wall;
   first and second opposing sidewalls that both extend between the upper wall and the lower wall; and
   an elongate aperture defined within the first sidewall;
an orientation measuring component supported by the frame;
a clip comprising:
   a first wall;
   a second wall;
   an aperture defined within the first wall; and
   an elongate projection extending outwardly from the first wall that engages the first sidewall's elongate aperture.

17. The level of claim 16, the elongate projection comprises a longitudinal axis perpendicular to the planar base surface, wherein a dimension of the elongate projection along its longitudinal axis is greater than a dimension of the elongate projection in a direction perpendicular to its longitudinal axis.

18. The level of claim 16, the elongate projection comprises a projection height that is perpendicular to the planar base surface and a projection length that is parallel to the frame's longitudinal axis, wherein the projection height is longer than the projection length.

19. The level of claim 18, wherein the projection height is at least 30% a height of the frame, the height of the frame being perpendicular to the planar base surface.

20. The level of claim 18, wherein the projection height is at least 45% a height of the frame, the height of the frame being perpendicular to the planar base surface.

* * * * *